UNITED STATES PATENT OFFICE.

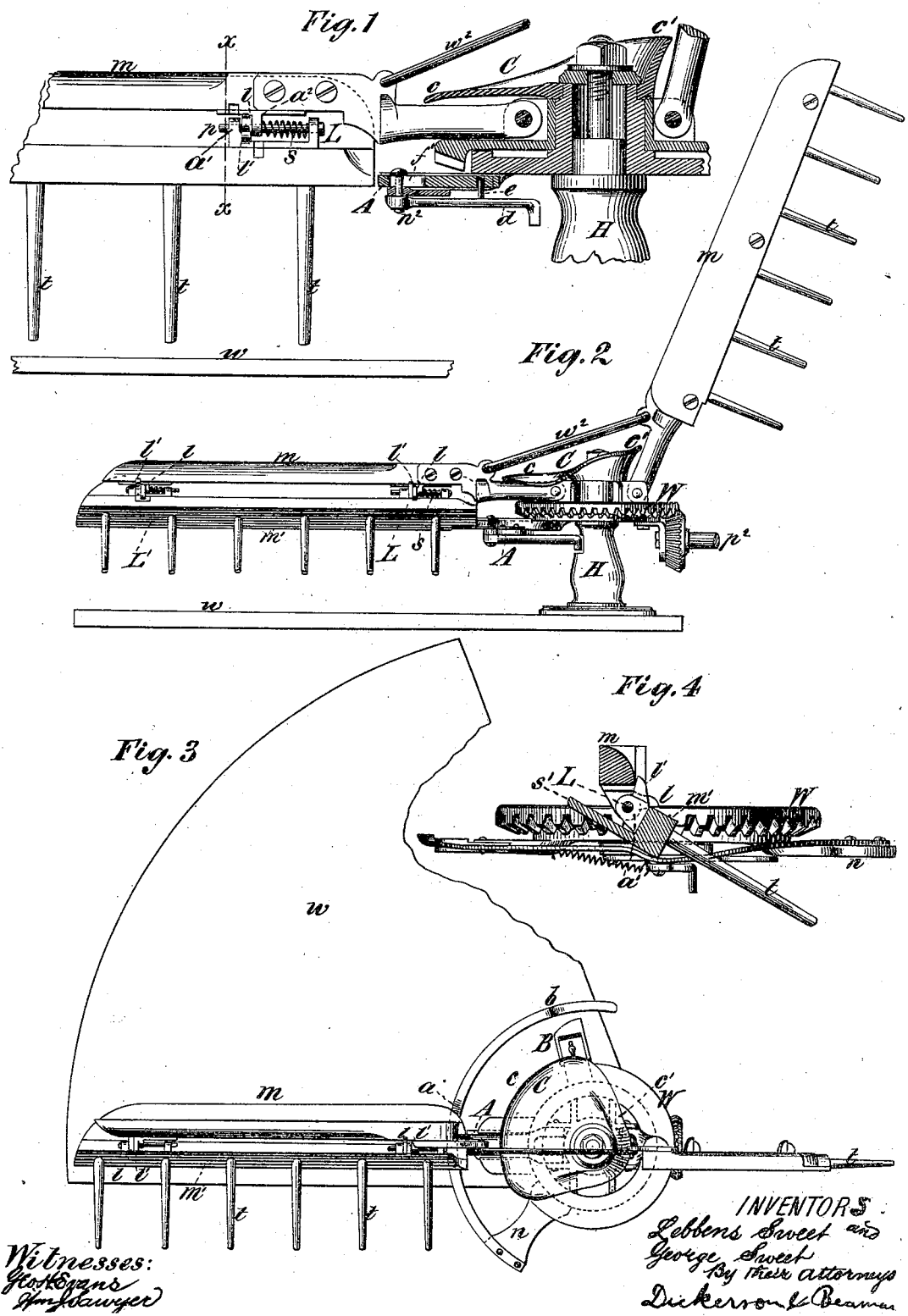

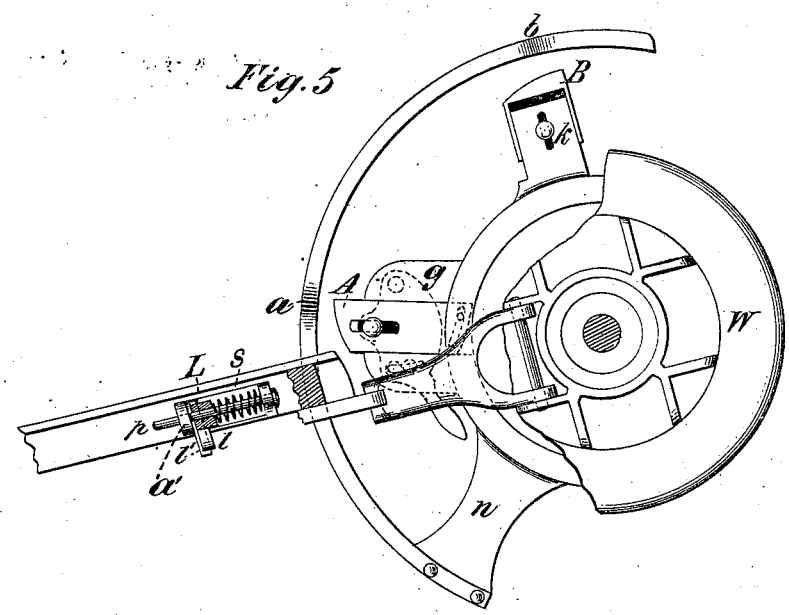
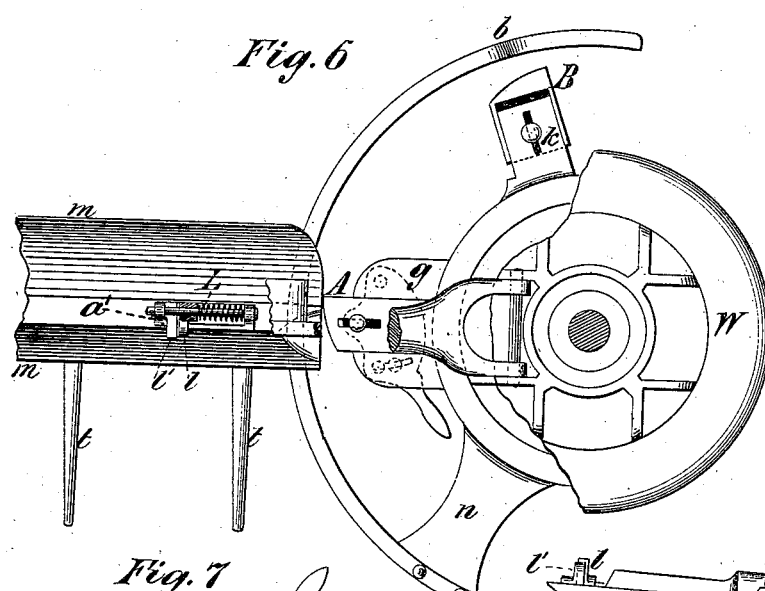
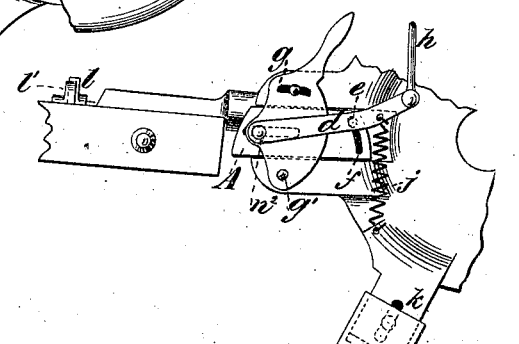
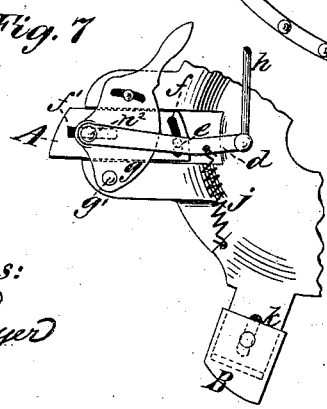

GEORGE SWEET, OF DANSVILLE, AND LEBBEUS SWEET, OF WELLSVILLE, NEW YORK.

IMPROVEMENT IN HARVESTERS.

Specification forming part of Letters Patent No. 193,355, dated July 24, 1877; application filed June 6, 1877.

*To all whom it may concern:*

Be it known that we, GEORGE SWEET, of North Dansville, Livingston county, New York, and LEBBEUS SWEET, of Wellsville, Allegany county, New York, have invented a new and useful Improvement in a Combined Rake and Beater, of which the following is a full, true, and exact description, reference being had to the accompanying drawings.

Our invention relates to an improvement in a combined rake and beater.

In machines of this character the revolving raking-arm can, at the will of the operator, be used either as a rake or as a beater to force the grain against the cutters. In this apparatus, in which two raking-bars alone are shown, but in which more may be employed, any one of these raking-bars may be caused to rake the grain across the platform, or the teeth of the rake may be caused to pass over the platform in a horizontal position without disturbing the grain which is deposited thereon. When the rake has finished its traverse over the platform, and has thereby moved the grain to the back edge, ready to be delivered upon the ground, it is important, in this delivery or dropping of the gavel upon the ground, that the grain be not scattered, but be deposited as close together as possible, so that it may be readily bound into sheaves by the following binders. In order, therefore, that the rake which has passed across the platform with its teeth vertical shall not scatter the gavel as it delivers it to the ground, we employ a tripping device, whereby the teeth are again brought horizontal, thereby leaving the grain at the moment that the gavel is being delivered to the ground, and this we consider a very important feature of our invention.

Heretofore, vibrating or rolling rake heads and teeth have been employed; but these vibrating rake-heads have always been supported at or near the center of rotation of the beater-arms, and have had no support at their outer or free ends, and, as an exact horizontal position is desirable in the sweep or traverse of these raking or beating arms across the platform, it has been found advisable to continue the supports of the vibrating rake-heads to its outer or free end, and this we consider another important point in our invention.

We will now describe our drawings.

Figures 1 and 2 represent general views of our apparatus. (Fig. 1 shows a cross-section of some of the operating parts.) Fig. 3 is a plan view of our apparatus, showing clearly the spring $a\,b$. Fig. 4 is a sectional view of Fig. 1 across the line $x\,x$. Figs. 5 and 6 are plan views of our apparatus, showing the detail of some of the working parts. Figs. 7 and 8 show the detail of our movable adjustable tripping device, as seen from beneath.

Similar letters of reference refer to similar parts in all the drawings.

In our apparatus opposing beater-arms $m\,m$ are attached to a crown-wheel, W, which is revolved by means of a pinion, $p^2$, in the usual way. The opposing arms $m\,m$ are attached to each other by means of a link, $w^2$, so that as one arm falls the other rises. The position of elevation or depression of these arms is determined by the guiding cam or roadway $c\,c'$, so that as the arm $m$ on the left, Fig. 2, is depressed by the lower part of the cam $c$ the other arm is elevated toward the upper part of the cam $c'$.

It is therefore evident that, as the crown-wheel W is revolved, the beater-arms $m$ will fall and rise, and will traverse the platform $w$ in a plane parallel with it. The beater-arm $m$ has attached to it a rake-head, $m'$, carrying the teeth $t$. This beater-arm, as will be observed, extends as far out as the rake-head $m'$. This rake-head $m'$ is attached to the beater-arm $m$ by means of two pivots and locking apparatus, L and L', one at the inner and one at the outer end of the beater-arm. This pivot and locking apparatus L is of a peculiar character, and is shown in detail in Figs. 1 and 4. The beater-arm has attached to it a pin, $p$, which passes through a lug, $a^2$, attached to $m$, and slides freely upon it—that is, the rake-head $m'$ can slide outward through the lug $a^2$ by means of its pins $p$. A spring, $s$, bears against the lug $a^2$ and the inner lug of $m'$, and thereby forces $m'$ in toward the center. Therefore, the tendency of the two springs is to force the rake-head inward while the rake-head will yield to pressure outward, and will move outward as far as the pins $p$ will permit, while in its outward position the rake can roll in its bearings L L', and thereby the teeth can be brought parallel with the platform $w$, but while in its inner position it is locked and prevented from rolling, as will be now described.

Attached to the lug $a^2$ is the dog or shoulder $l$. The outer lug $a^1$ of $m'$ has attached to it a dog or shoulder, $l'$, which parts are shown in detail in Fig. 4. Whenever the teeth $t$ are vertical the dog $l'$ can pass beneath the dog $l$, and the rake-head $m'$ is forced inward by means of the springs $s$, and so long as $l'$ is bebeath $l$, and bearing against it, it is evident that $m'$ cannot roll in its bearings, and that the teeth and the rake-head are kept vertical; but whenever $m'$ is forced outward, so that the dog $l'$ is clear of the dog $l$, then it is possible for the rake-head $m'$ to roll in its bearings, and allow the teeth to assume a horizontal position.

The roll of the rake in one direction is stopped by means of the dog $l'$ bringing up against the beater-arm $m$, Fig. 4. Its roll in the opposite direction is stopped by means of a shoulder or side piece, $s'$, Fig. 4, connected with $m'$, bringing up against the opposite side of $m$.

As the rake-head traverses the platform $w$, a spring, $a\ b$, bears continually against it and causes a friction against the lower surface of $m'$, which friction has a tendency to throw the teeth upward, and to cause the rake-head to roll in its bearings. This spring is supported by means of an arm, $n$, attached to the main stand H of the machine, Fig. 3. There are two bends, angles, or elevations in this spring, one at $a$ opposite the tripping device A, the other at $b$ opposite the tripping device B.

By means of these bends or elevations in the spring an increased friction is applied at those points. It is now evident that if $m'$ be forced outward, so that $l'$ is clear of $l$, that this friction will cause the rake-head to roll in its bearings, and to bring the teeth $t$ parallel with the platform $w$, and that the upward pressure of the spring $a\ b$ will hold these teeth horizontal until the rake-arm $m'$ has passed free of it, when the weight of the teeth will cause the rake-head to roll in its bearings till the dog $l'$ passes beneath the dog $l$, and the teeth and rake-head are again locked in their vertical position, so that the teeth will always approach the platform $w$ in a vertical position, and the apparatus will be a raker till the rake-head $m'$ is forced outward and has rolled in its bearings. The apparatus for thus forcing the rake-head outward will now be described.

There are two trip devices, A and B, connected to the rake-standard. These trip devices consist of a wedge or cam shaped surface, so arranged that it will bring up against the inner end of $m'$, force it outward, and thereby cause the rake-head to roll in its bearings, as has been described.

The back trip B is a stationary one, though it is adjustable by means of a slot, $k$, and setscrew, as is clearly shown in Figs. 5 and 6. This trip is so arranged that it will trip the rake-head and cause it to roll at the same instant that it is delivering the gavel to the ground, and thereby a scattering of the grain is prevented.

The forward trip A, Figs. 7 and 8, is also adjustable, and its position is likewise controlled by the operator, at his pleasure. It consists of a trip apparatus, A, having an inclined or wedged surface at its outer end. This piece A slides freely in a mortise-frame or a supporting-slot cut in part of the rake-standard.

The piece A moves in or out, and is adjustable by means of a slot, $f'$, through which passes a supporting and guiding pin, $n^2$, as is clearly shown in the figures. Through the rear end of the tripping piece A there is cut a slot, $f$, which slot is an arc of a circle. Through this slot there passes a pin, $e$, upon an arm, $d$, which arm is pivoted on an adjusting-piece, $g$. This adjusting-piece $g$ is pivoted at $g'$, so that by its movement the arm $d$ can be adjusted inward or outward, so as to act properly.

The slot $f$ is so cut that as the pin $e$ is thrown in one direction the tripping-piece A is drawn inward by the action of the pin $e$ against it, while it is thrown outward by the movement of $e$ in the opposite direction. The position of $d$ is controlled by means of a spring, $j$, in one direction, while the link $h$ draws it in the opposite direction at the will of the operator, who can move $h$ by a treaddle, or equivalent device. It will be observed that the tripping-piece A cannot be forced inward by the pressure of $m'$ upon it, while it is readily drawn inward by the movement of the arm $d$ at the will of the operator.

This tripping device A is so placed that it will roll the teeth upward as soon as they have passed the cutter-bar, so that, in its ordinary position, the entire apparatus will act as a beater; but if the tripping device is drawn in by the operator, then the teeth will pass across the platform vertically, and the apparatus will be a rake. The rake-head will, however, be always tripped and rolled at the back end of the platform on account of the tripping device B.

What we claim as our invention, and desire to secure by Letters Patent, is—

1. A beater-arm connected to a rake-head by two supporting locking-pivots, one at the inner and the other at the outer end of the rake-head, whereby the said rake-head is firmly supported, while at the same time it is permitted to roll in its bearings, when combined with apparatus, substantially as described, whereby the said rake-head is automatically rolled in its bearings and caused to traverse the platform with its teeth in a horizontal position.

2. The combination of a rolling rake-head supported and locked at its inner and outer end with two trips, one at the front end and the other at the rear end of the platform, the front trip being occasionally operative, while the back trip is permanently operative, substantially as described.

3. The combination of a rolling rake-head with a tripping device and a spring, the friction of which spring, together with the movement of the rake-head, serves to roll the head in its supporting-bearings, substantially as described.

4. The combination of a rolling rake-head with the supporting-pivot $p$, the jaws $l\ l'$ and the springs, substantially as described.

5. The combination, with a rolling rake-head, of a spring, having bevels or angles, and a tripping device, for the purpose of rolling the rake-head, substantially as and for the purposes described.

6. A movable tripping device, which consists of a sliding tripping-piece, actuated and held in position by means of a pin moving in a transverse slot, substantially as described.

7. A rolling rake-head movable longitudinally, when combined with a longitudinally-acting spring bearing against said rake-head, substantially as described.

8. The combination of a rake-head supported and locked at the inner and outer ends with a permanent back trip, which trip serves to roll the rake-head in its bearings at the instant of the delivery of the gavel to the ground, substantially as described.

GEO. SWEET.
LEBBEUS SWEET.

Witnesses:
GEO. H. EVANS,
WM. J. SAWYER.